United States Patent [19]

Chruniak

[11] Patent Number: 5,181,555
[45] Date of Patent: Jan. 26, 1993

[54] PORTABLE FOOD AND BEVERAGE STORAGE UNIT MOUNTED ADJACENT AN AIR VENTILATOR

[76] Inventor: Stephen A. Chruniak, 68 Longfellow Dr., Newburyport, Mass. 01950

[21] Appl. No.: 742,296

[22] Filed: Aug. 8, 1991

[51] Int. Cl.⁵ .................. B60H 3/04; A47K 1/08
[52] U.S. Cl. .................... 165/41; 165/80.1; 248/311.2; 248/205.2; 62/239; 62/244; 62/371; 62/377; 62/457.1
[58] Field of Search ............. 165/41, 80.1; 62/239, 62/244, 371, 377, 457.1; 248/205.2, 311.2; 239/55, 57

[56] References Cited

U.S. PATENT DOCUMENTS

| | | | |
|---|---|---|---|
| 1,540,484 | 6/1925 | Larsen | 239/55 |
| 1,751,257 | 3/1930 | Vallebuona | 239/55 |
| 3,410,337 | 11/1968 | Priest | 165/41 |
| 3,505,830 | 4/1970 | Koerner | 62/244 |
| 3,711,024 | 1/1973 | Hammond | 239/55 |
| 3,757,851 | 9/1973 | Marble | 165/41 |
| 3,797,742 | 3/1974 | Clark et al. | 239/57 |
| 3,885,738 | 5/1975 | Chesmel et al. | 239/57 |
| 3,916,639 | 11/1975 | Atkinson | 62/244 |
| 4,283,011 | 8/1981 | Spector | 239/57 |
| 4,478,052 | 10/1984 | McDowell | 62/244 |
| 4,523,870 | 6/1985 | Spector | 98/2.11 |
| 4,653,289 | 3/1987 | Hodgetts | 62/244 |
| 4,739,626 | 4/1988 | Djelic | 62/244 |
| 4,779,831 | 10/1988 | Anderson | 248/311.2 |
| 4,852,843 | 8/1989 | Chandler | 248/311.2 |
| 4,892,137 | 1/1990 | Bibik, Jr. | 165/80.1 |
| 4,892,138 | 1/1990 | Bibik, Jr. | 165/80.1 |
| 5,092,395 | 3/1992 | Amidzich | 165/41 |

FOREIGN PATENT DOCUMENTS

| | | | |
|---|---|---|---|
| 359471 | 3/1906 | France | 239/55 |
| 2558697 | 8/1985 | France | 239/57 |
| 212146 | 2/1941 | Switzerland | 239/57 |

Primary Examiner—John K. Ford
Attorney, Agent, or Firm—Linda M. Buckley; David S. Resnick

[57] ABSTRACT

The present invention relates to a portable storage unit for food or drink items which is adapted for mounting over an air ventilator of an air-conditioner or heating unit, thus allowing items stored within to be cooled or heated, as desired. Additionally, in a preferred embodiment, the unit of the present invention is formed of an insulating material thus allowing the user to remove the device from the vehicle and transport the stored items without the need for a conventional cooler.

7 Claims, 1 Drawing Sheet

PORTABLE FOOD AND BEVERAGE STORAGE UNIT MOUNTED ADJACENT AN AIR VENTILATOR

FIELD OF THE INVENTION

The present invention relates to a portable storage unit for food or drink items which is adapted for mounting over an air ventilator of an air-conditioner or heating unit, thus allowing items stored within to be cooled or heated, as desired.

BACKGROUND OF THE INVENTION

Many people enjoy eating or drinking, hot and cold food or beverages while traveling on vacation, or commuting to work. Many people also enjoy carrying food or beverages with them for an outing, such as a picnic or a day at the beach. Usually, these food items require refrigeration to prevent spoilage and/or to make them more enjoyable.

It is common for many people to keep such beverages or food in a container such as a thermally-insulated chest or cooler. However, insulated chests or coolers require ice or other cooling material to maintain the food or drink in a refrigerated condition, and frequently require the addition of ice or new cooling material. During a long trip, or after an outing, additional ice or new cooling material may not be available, and therefore, food items not previously consumed will either spoil or become unpalatable.

It is known that vehicle air conditioners can be used to cool food and beverages. Many of these devices, as exemplified in U.S. Pat. No. 3,505,830, 3,916,639, and 4,478,052, are remotely connected to the air-conditioner via a hose or conduit which can easily be punctured or dislodged by the vehicle occupants. In addition, these devices occupy much valuable space within the passenger compartment. Furthermore, these devices are expensive to produce and are not easily portable.

One approach to overcome these problems has been the use of smaller devices which attach directly to the vehicle air ventilator. Such devices are exemplified in U.S. Pat. No. 4,653,289 and 4,892,137. These devices, however, are neither portable nor insulated, and are therefore limited to use only in a vehicle. Such devices would not allow the user to remove the device from the air ventilator and transport the food or beverage items while keeping them insulated. If a user wished to transport the stored items outside the vehicle, it would be necessary to remove the items from the unit and place them in a conventional ice chest or cooler.

Accordingly, devices which overcome the drawbacks discussed above are being sought.

SUMMARY OF THE INVENTION

The present invention relates to a portable storage unit which avoids the disadvantages of the prior art. The present invention provides a simple, inexpensive and portable device which allows the user to transport items, such as food and beverages, for extended periods of time while keeping the items at a desired temperature, and thus preventing spoilage and allowing maximum palatability. The unit of the present invention can also be used to transport certain pharmaceutical products that are sensitive to the effects of heat, for example insulin. Additionally, in a preferred embodiment, the unit of the present invention is formed of an insulating material thus allowing the user to remove the device from the vehicle and transport the stored items without the need for a conventional cooler.

The portable storage unit of the present invention comprises a container of suitable material or materials. The container is adapted to be releaseably mounted adjacent an air ventilator. The air ventilator may be a vehicle air conditioning or heating unit, a stationary room air conditioner or heating devices, and others. The container may be of any suitable shape, including square, rectangular, or round. The container has a first displaceable cover providing access to the interior of the container, thus allowing items to be placed within and removed from the container. The container section adapted to be mounted adjacent the air ventilator has a second displaceable cover which when displaced exposes an air passageway leading to the interior of the container. When the air passageway is not exposed, for example when the unit is not mounted, releaseable sealing means, e.g., VELCRO, affixed on the inside of the cover and on the container around the perimeter of the air passageway cooperate to seal the cover to the container. The container is releasably mounted adjacent to an air ventilator by suitable mounting means, for example, VELCRO strips or hooks. When the container is mounted adjacent to an air ventilator, the second displaceable cover is displaced thereby exposing the air passageway to the air ventilator, thus allowing conditioned air, cooled or heated, to enter the container.

One form of mounting means includes VELCRO mounted on the second displaceable cover and corresponding VELCRO mounted adjacent the air ventilator. When the unit is removed from its mounting, the displaceable cover can be placed in its downward position covering and sealing the air passageway, and allowing the unit to be transported. In a preferred embodiment, the unit is formed of insulating material, thus allowing the unit to be transported away from its mounting while keeping the contents insulated. The container can have a carrying handle to allow the unit to be easily transported.

The storage unit of the present invention does not require hosing or a conduit for attachment to the air ventilator, since in accordance with the present invention, the unit need not be directly attached to the air ventilator, but need only be mounted adjacent an air ventilator so that conditioned air enters the container through the air passageway effectively cooling or heating the contents. In addition, the portable storage unit of the present invention is relatively inexpensive to construct and has very few parts.

Various other aspects of the present invention are set forth in the following detailed description and accompanying drawings.

BRIEF DESCRIPTION OF THE DRAWINGS

A more complete understanding of the invention may be provided by reference of the accompanying drawing wherein.

DETAILED DESCRIPTION OF THE INVENTION

Although the present invention will be illustrated by means of a portable storage unit 10 which is adapted for mounting adjacent a vehicle dashboard mounted ventilator, it will be appreciated by those of ordinary skill in the art that such units can be mounted adjacent a variety of ventilators, including that of a stationary room air-conditioner or heater.

Figure 1:
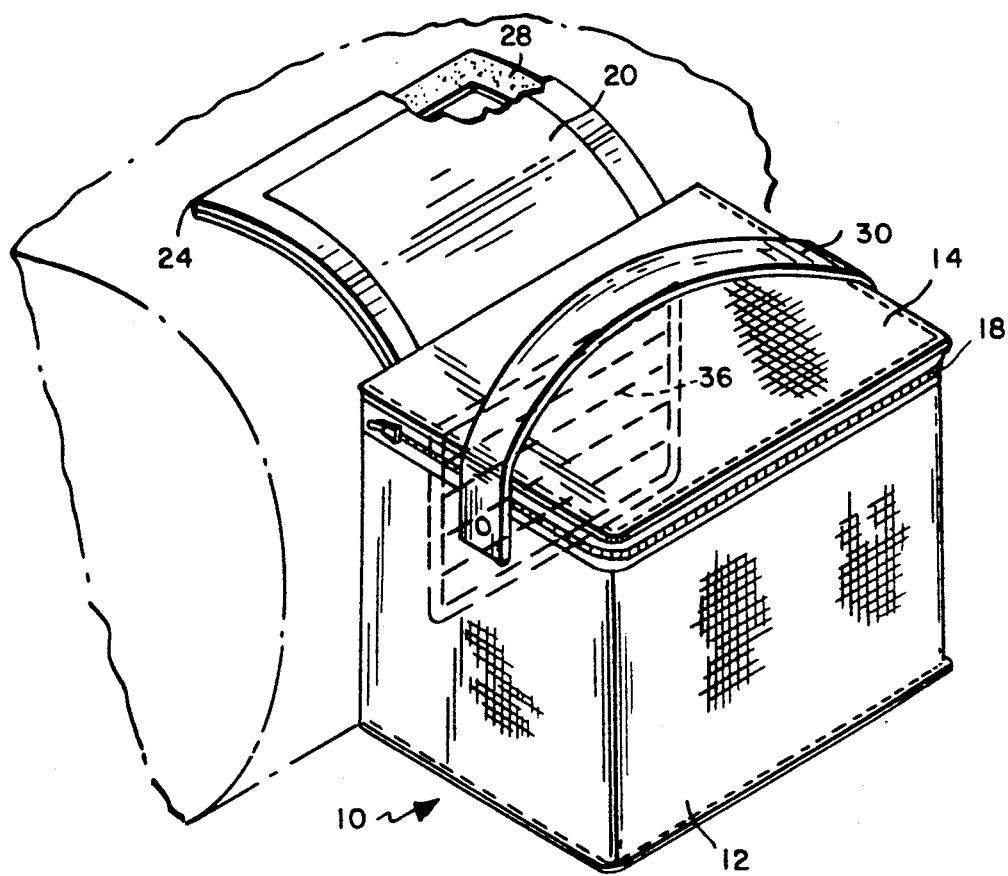
FIG. 1 is a prospective view of the present invention releasably mounted adjacent an air ventilator.

Referring now to FIG. 1, there is shown the portable storage unit, generally designated 10, mounted on a vehicle dashboard adjacent a conventional vehicle heating and/or cooling air ventilator 36. The unit may be used in any vehicle with a dashboard mounted ventilator, including an automobile, truck, of the like. The unit may also be mounted over a ventilator of a stationary room air-conditioner.

Figure 2:
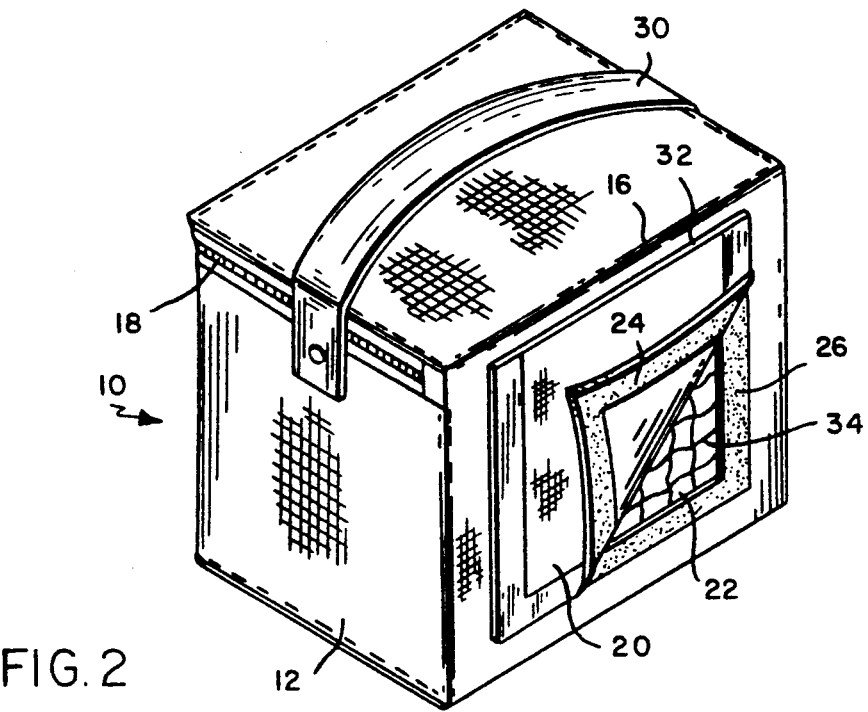
FIG. 2 is a rear view of the present invention with the second displaceable cover partially open.

In the embodiment shown in FIGS. 1-2, unit 10 comprises a container 12 having a rectangular cross-section. Alternatively, the container can be of any shape. The container 12 has a displaceable cover 14 hinged at the top. The hinge may be a conventional hinge, or as shown in FIG. 2 at 16, the hinge may be formed from the pliable material used to construct the container. The displaceable cover 14 provides access to the interior of the container allowing for placement and removal of items. When the cover is closed, a zipper 18 acts to secure the cover to the container.

Also, as seen in FIG. 2, on the side of the container 12 adapted to be adjacent to the air ventilator, the container has a second displaceable cover 20, exposing an air passageway 22 leading to the interior of the container. The cover 20 may be hinged. The hinge may be a conventional hinge, or as shown in FIG. 2 at 32, the hinge may be formed from the pliable material used to construct the container. When the air passageway is not exposed, for example when the unit is not mounted, VELCRO strips affixed on the inside of the cover, as shown at 24, and on the container around the perimeter of the air passageway 26, cooperate to seal the cover to the container. The cover can also be releasably sealed to the container through the use of alternative releaseable sealing means, for example, a zipper or snaps.

In use, the unit 10 is releasably mountable adjacent an air ventilator, for example a dash-mounted vehicle air ventilator, and is positioned so that conditioned air from the air ventilator enters the interior of the container 12 through air passageway 22 heating or cooling the items stored within the container interior. For this purpose, the unit may be releaseably mounted adjacent to the air ventilator by suitable means, such as one or more releaseably engagable fasteners affixed to the container engagable with one or more releaseably fasteners affixed adjacent to the air ventilator. Such fasteners include, for example, hooks or snaps. In one preferred embodiment, the releaseable fasteners are matching hook and loop type fasteners, commonly identified under the trademark VELCRO, a trademark of VELCRO Industries, Inc., B.V., Holland. As shown in FIG. 1, in the preferred embodiment, VELCRO 24 affixed to the displaceable cover 20 and engagable with VELCRO 28 affixed adjacent to the air ventilator is used to releaseably mount the unit. This allows the container 12 to be easily mounted adjacent the air ventilator and positioned such that conditioned air from the ventilator 36 enters the interior of the container through passageway 22, while also allowing the unit to be easily dismounted.

The portable storage unit of the present invention may also include a carrying handle 30 that allows the unit to be easily carried when the unit is dismounted. The carrying handle 30 can be adjustable permitting its length to be increased or decreased. The carrying handle 30 may also be used as an alternative releaseable mounting means through the use of, e.g., a hook or hooks positioned on the handle. The hooks can be used to engage the louvers of a windshield defroster ventilator common in most vehicles, and the length of the carrying handle can then be adjusted to position the container 12 adjacent the air ventilator.

In another preferred embodiment, a netting 34 of a suitable material, such as nylon or plastic, can be positioned adjacent the air passageway way 22, thus preventing items stored within the container from escaping through air passageway 22.

The container 12 is made of suitable material such as well-known plastics or nylon. Preferably, the materials are suitable insulating materials. Many such materials, such as polystyrene plastic, i.e. STYROFOAM or other suitable plastic, are known to those skilled in the art. Most preferably, the material is a multi-layer construction with an inner layer of waterproof plastic, an outer layer of nylon and a layer of insulation material sandwiched between the inner and outer layers. A pliable material is preferred to enable the unit to be collapsed without breaking, and thus easily stored in an automobile glove compartment, trunk, or under the seat.

The following example of this invention is not intended to limit the invention, but is merely by way of illustration.

EXAMPLE 1·

Five room temperature (70° F.) beverage cans were placed within the interior of the container. The starting temperature of the container interior was approximately 79° F. The unit was mounted using VELCRO attachments on the dashboard of a 1990 Nissan King Cab pickup truck with the air passageway positioned over the air ventilator. The vehicle air-conditioning was activated and the temperature was set at its coldest position with its fan blower turned to its maximum. After five minutes of driving, the temperature inside the container was 43° F. The temperature of the air-conditioner was then turned to its lowest level. After an additional 25 minutes of driving, the temperature inside the container space was 45° F. and the beverages were cold enough to be enjoyable.

The foregoing description of the present invention is merely illustrative thereof, and it is understood that variations and modifications can be effected without departing from the spirit or scope of the invention as set forth in the following claims.

What is claimed is:

1. A portable storage system for mounting adjacent an air ventilator of an air delivery system comprising;
    a container formed from a pliable material;
    (i) said container having a first displaceable cover located above a first opening in the top of said container providing access to the interior of said container in an open position and covering said first opening in a closed position,
    (ii) said container having a second displaceable cover located beside a second opening in a sidewall of said container, said second opening being an air passageway leading air from said air ventilator into the interior of said container,
    (iii) said second displaceable cover covering said second opening in a closed position and allowing an air flow through said air passageway in an open position, (iv) said second displaceable cover provided with at least one first releasable fastener facing said container sidewall when said second displaceable cover is in a closed position, (v) at least one second releasable fastener disposed on the exterior of the container, said at least one first releasable fastener cooperating with said at least one second releasable fastener to releasably seal said second displaceable cover to said container in said closed position thereof and, (vi) at least one third releasable fastener mounted adjacent said air ventilator, said at least one first releasable fastener in said open position of said second displaceable cover cooperating with said at least one third releasable fastener to suspend the container adjacent to said air ventilator and to releasably fasten said container to said air ventilator so as to expose the air passageway to said air ventilator.

2. The system of claim 1, wherein said air ventilator comprises the air ventilator of a vehicle.

3. The system of claim 1, wherein said releasable fasteners are VELCRO.

4. The system of claim 1, wherein said second displaceable cover is hinged to said container.

5. The system of claim 1, further including a netting disposed adjacent said air passageway, whereby when items are stored within said container, said netting prevents the items from escaping through said passageway.

6. The system of claim 1, wherein the air ventilator is connected to an air conditioning system.

7. The system of claim 1, wherein the air ventilator is connected to a heating system.

* * * * *